United States Patent
Oh et al.

(10) Patent No.: US 7,389,098 B2
(45) Date of Patent: Jun. 17, 2008

(54) HETERODYNE RECEIVER FOR LOW NOISE AND IMAGE FREQUENCY REPRESSION

(75) Inventors: Nam Jin Oh, Daejeon (KR); Moon Su Yang, Daejeon (KR); Sang Gug Lee, Daejeon (KR)

(73) Assignee: Information and Communication University Research and Industrial Cooperation Group, Daejeon (KR)

( * ) Notice: Subject to any disclaimer, the term of this patent is extended or adjusted under 35 U.S.C. 154(b) by 724 days.

(21) Appl. No.: 10/947,863

(22) Filed: Sep. 23, 2004

(65) Prior Publication Data
US 2005/0064838 A1    Mar. 24, 2005

(30) Foreign Application Priority Data
Sep. 23, 2003    (KR) ............... 10-2003-0065895

(51) Int. Cl.
*H04B 1/10*    (2006.01)
(52) U.S. Cl. ............... 455/285; 455/323; 455/333; 327/113
(58) Field of Classification Search ............... 455/280, 455/283, 285, 296, 302–306, 313, 315, 318, 455/319, 323, 333; 327/108–111, 113
See application file for complete search history.

(56) References Cited

U.S. PATENT DOCUMENTS

| | | | | |
|---|---|---|---|---|
| 6,959,178 B2* | 10/2005 | Macedo et al. | ............. | 455/313 |
| 6,975,838 B1* | 12/2005 | Rofougaran et al. | .......... | 455/20 |
| 7,248,850 B2* | 7/2007 | Shen | ......................... | 455/318 |
| 2003/0119474 A1* | 6/2003 | Kimura | ...................... | 455/333 |
| 2003/0157912 A1* | 8/2003 | Atkinson et al. | ........ | 455/234.1 |

FOREIGN PATENT DOCUMENTS

JP    2000-307350    11/2000

* cited by examiner

*Primary Examiner*—Edward F. Urban
*Assistant Examiner*—Nhan T. Le
(74) *Attorney, Agent, or Firm*—Alston & Bird LLP

(57) ABSTRACT

Disclosed is a heterodyne receiver for low noise and image frequency repression, comprising: a low noise amplifier for receiving an input signal from an antenna and amplifying the signal while reducing a noise figure of the input signal; and a frequency converter for receiving both the input signal outputted from the low noise amplifier and a local oscillation signal, filtering the signals to repress gain of the input signal at an image frequency band and increase gain of the input signal at a signal frequency band, and converting the frequency of the signals to the intermediate frequency band.

5 Claims, 10 Drawing Sheets

HETERODYNE RECEIVER FOR LOW NOISE AND IMAGE FREQUENCY REPRESSION

CROSS REFERENCE TO RELATED APPLICATION

This application claims priority to and the benefit of Korea Patent Application No. 10-2003-0065895 filed on Sep. 23, 2003 in the Korean Intellectual Property Office, the entire content of which is incorporated herein by reference.

BACKGROUND OF THE INVENTION (a) Field of the Invention

The present invention relates to a heterodyne receiver including a frequency converter for low noise and image frequency repression being applied to a heterodyne communication system.

(b) Description of the Related Art

Figure 1:
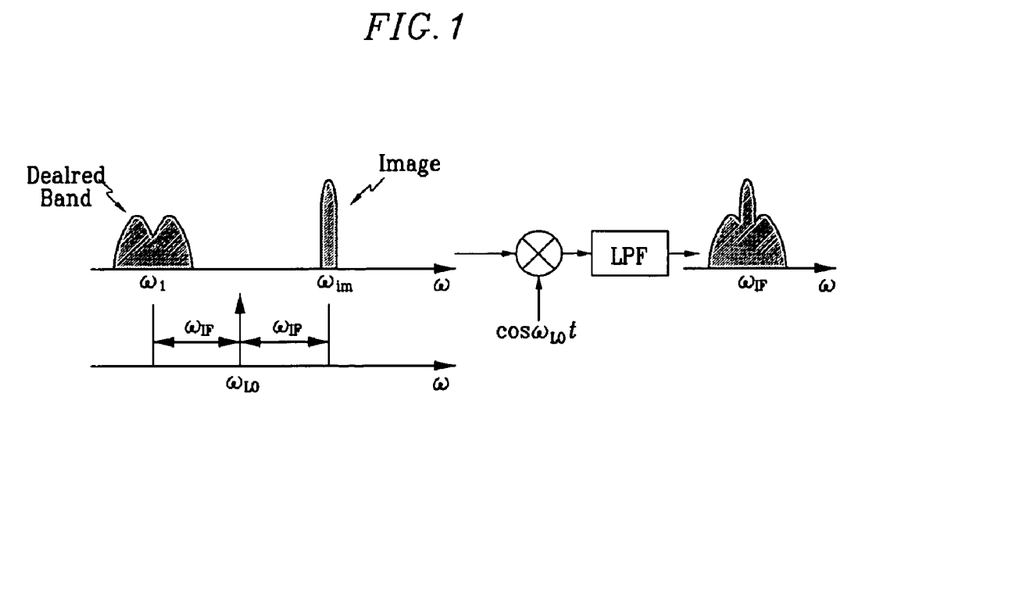
FIG. 1 shows the image frequency problem of a frequency converter.

FIG. 1 shows the image frequency problem of a frequency converter.

As shown in FIG. 1, a desired signal W1 and an image frequency are separated by intermediate frequency $W_{IF}$ from a local oscillating frequency LO in both directions. Both signals are then converted by the frequency converter to the same intermediate frequency.

In particular, distortion of a desired signal increases during frequency conversion when the image signal is large. As a result, an additional function to suppress the image frequency is required.

Figure 2:
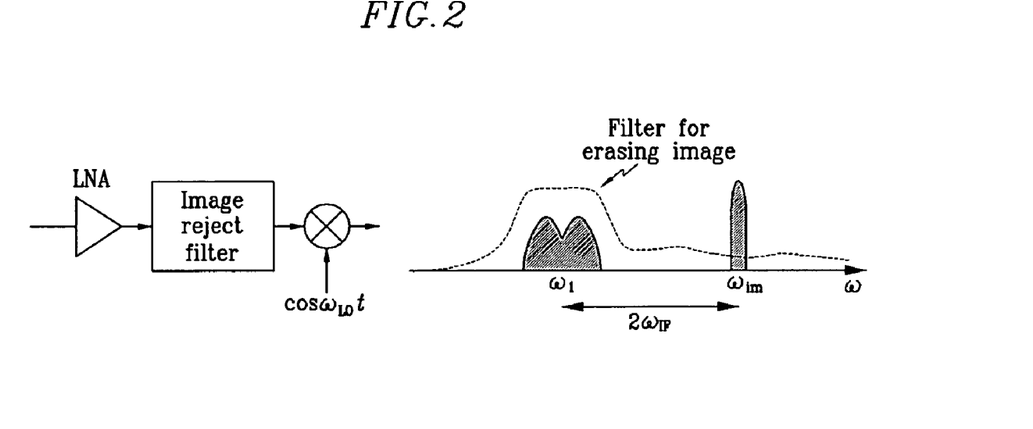
FIG. 2 shows a brief construction of a heterodyne receiver according to a conventional method.

FIG. 2 shows a brief construction of a heterodyne receiver according to a conventional method.

As shown in FIG. 2, the heterodyne receiver according to a conventional method has a filter located between a low noise amplifier and a frequency converter for suppressing the image frequency.

The filter for suppressing the image frequency in the heterodyne receiver can be implemented as a manual type filter for external usage or as a filter having a Hartely or Weaver construction.

However, the embodiment of above with Hartely architecture or Weaver architecture has the problem of being complicated, so it is typical for a filter for suppressing an image frequency being added between the low noise amplifier and the frequency converter.

Figure 3:
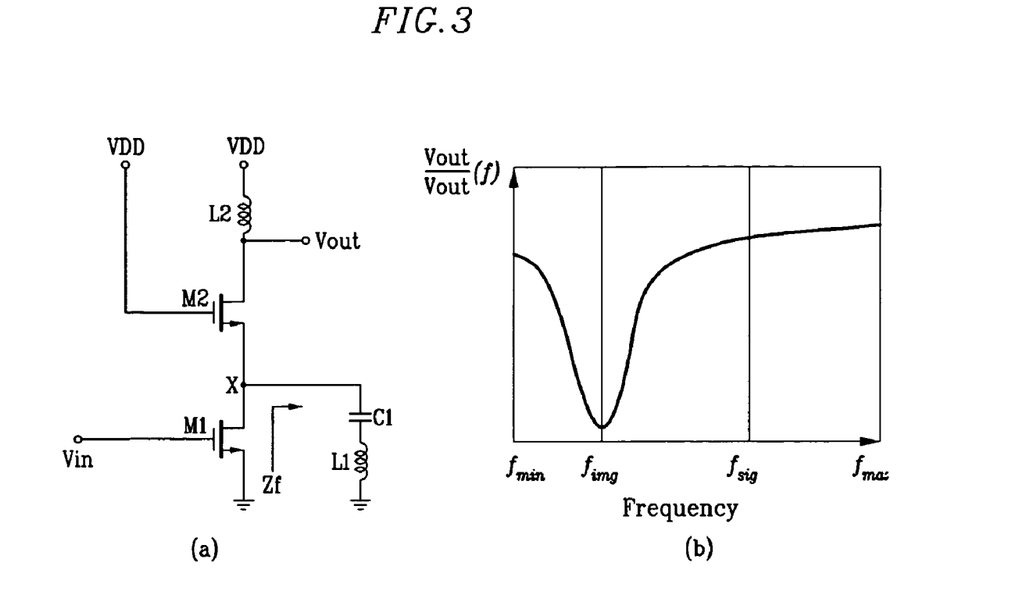
FIG. 3 shows a circuit of a low noise amplifier including a filter for suppressing an image frequency according to a first example of a conventional method.
Figure 4:
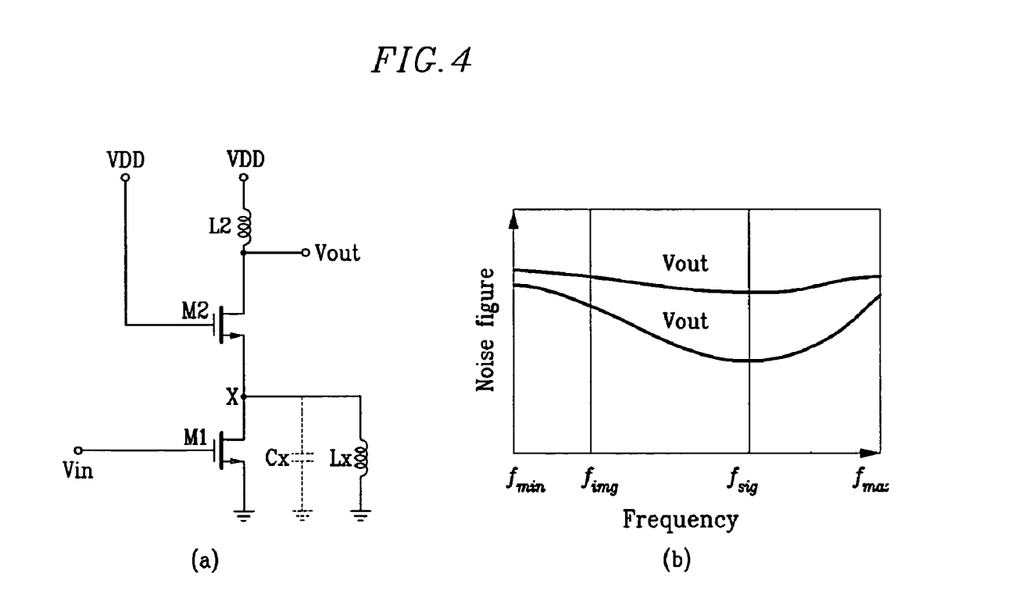
FIG. 4 shows a circuit of a low noise amplifier including a filter for suppressing an image frequency according to a second example of a conventional method.
Figure 5:
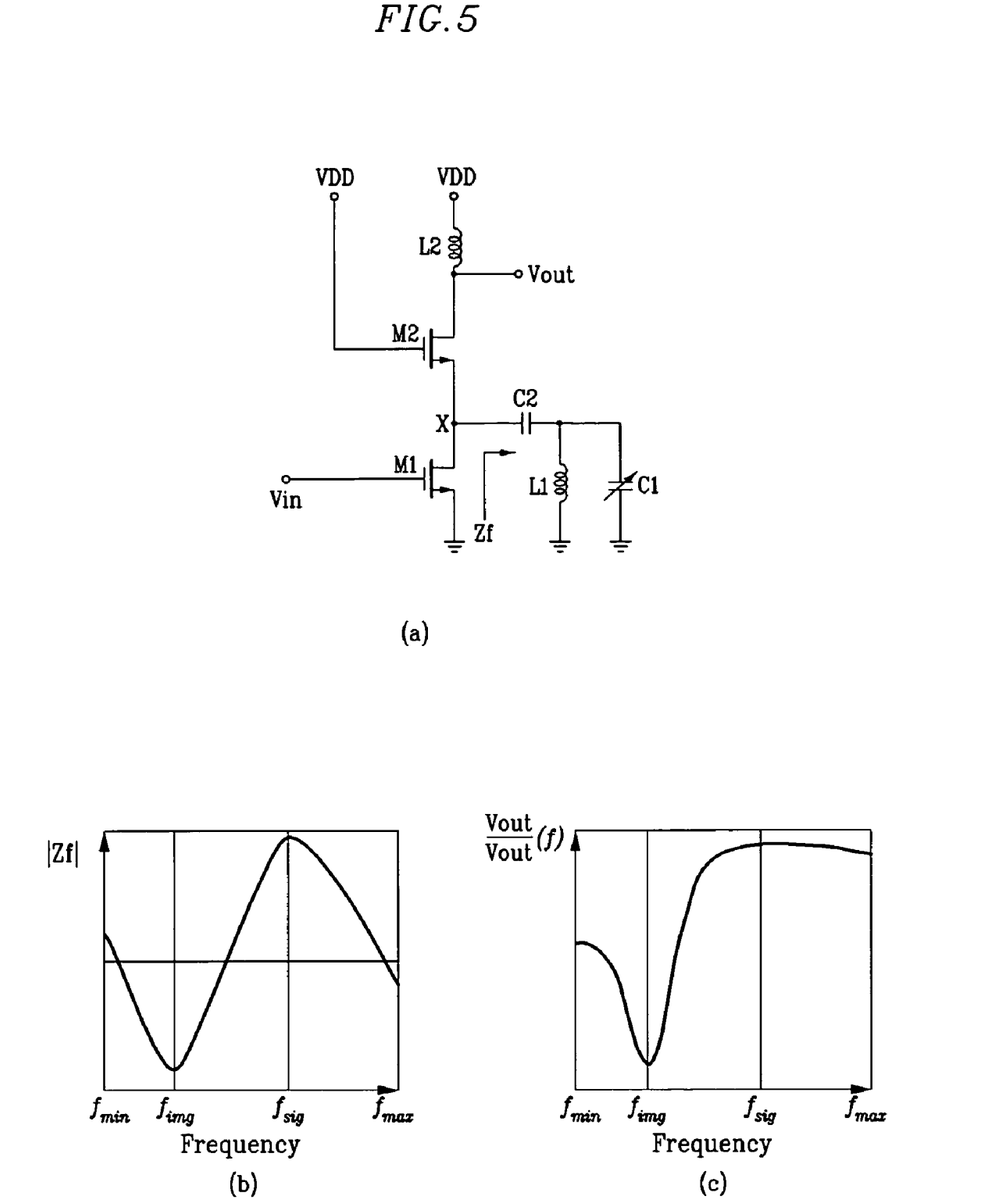
FIG. 5 shows a circuit of a low noise amplifier including a filter for suppressing an image frequency according to a third example of a conventional method.

FIG. 3 to FIG. 5 show circuits of low noise amplifiers including filters for suppressing an image frequency according to a first, second, and third example of the conventional methods.

First, the low noise amplifier including the filter for suppressing an image frequency according to the first example of the conventional method includes a filter circuit for image suppressing composed of a first inductor L1 and a first capacitor C1 functioning as a filter and an amplifier circuit composed of transistors M1 and M2 and a second inductor L2.

Impedance

<PSTYLE ∈ DENT = 0LSPACE = 130 > |$Z_r$| at a node X is reduced by a series resonance between the first inductor and the first capacitor, and thus a signal current which is applied to the transistor M2 is reduced. As a result, an image frequency gain, $V_{out}/V_{in}$ is reduced.

Meanwhile, FIG. 3b shows that the low noise amplifier including a filter for suppressing an image frequency according to the first example has a property for suppressing the image frequency.

Next, the low noise amplifier including a filter for suppressing an image frequency according to the second example of the conventional method has a similar construction to the first example except for the circuit for suppressing the image frequency.

That is, impedance at the node X is reduced by a parasitic capacitance Cx when an Lx is absent as shown in FIG. 4a. Thus, the gain of a CASCODE composed of the transistors M1 and M2 is reduced.

Further, the Cx increases influence of the noise from the transistor M2 and decreases influence of the signal current from the transistor M1 to the transistor M2. Thus, the property of a noise figure of the low noise amplifier worsens.

Thus, the low noise amplifier including a filter for suppressing an image frequency according to the second example has a frequency property of the noise figure as shown in FIG. 4b. From the frequency property, it can be known that the noise figure can be improved by parallel resonance between Cx and Lx at the signal frequency $f_{sig}$.

The low noise amplifier including a filter for suppressing an image frequency according to the third example is to implement a third filter by properly combining the constructions of the first example and the second example.

The low noise amplifier including a filter for suppressing an image frequency includes a first inductor L1, a capacitor C2, and a variable capacitor C1 as shown in FIG. 5a. The low noise amplifier can modify the image frequency which is desired to be suppressed, by changing the capacitance of C1.

The impedance property of the third filter is shown in FIG. 5b. Impedance

<PSTYLE ∈ DENT = 0LSPACE = 130 > |$Z_r$| at the node X is reduced at the image frequency $f_{img}$, and is increased at the signal frequency $f_{sig}$.

As shown in FIG. 5c, for the input-output property of the amplifier, the Vout/Vin at the image frequency has 'V' type narrowband properties. Correct control of the filter for series resonance at an image frequency is required to suppress the image frequency. On the other hand, the flat input-output property of a proper wideband is provided at around the signal frequency, so correct control for parallel resonance is not required.

Thus, the third filter suppresses the image frequency and offsets the influence of the parasitic capacitance at the node X. The noise property is therefore improved.

Figure 6:
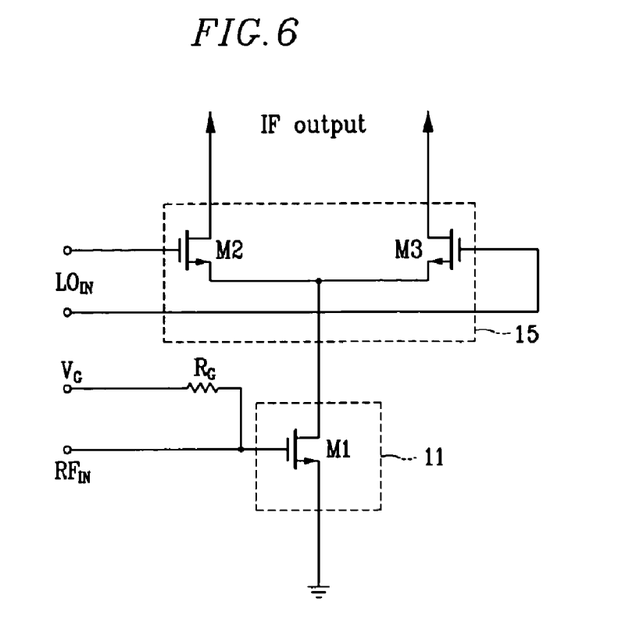
FIG. 6 shows a circuit of an active frequency converter according to a first example of the conventional method.
Figure 7:
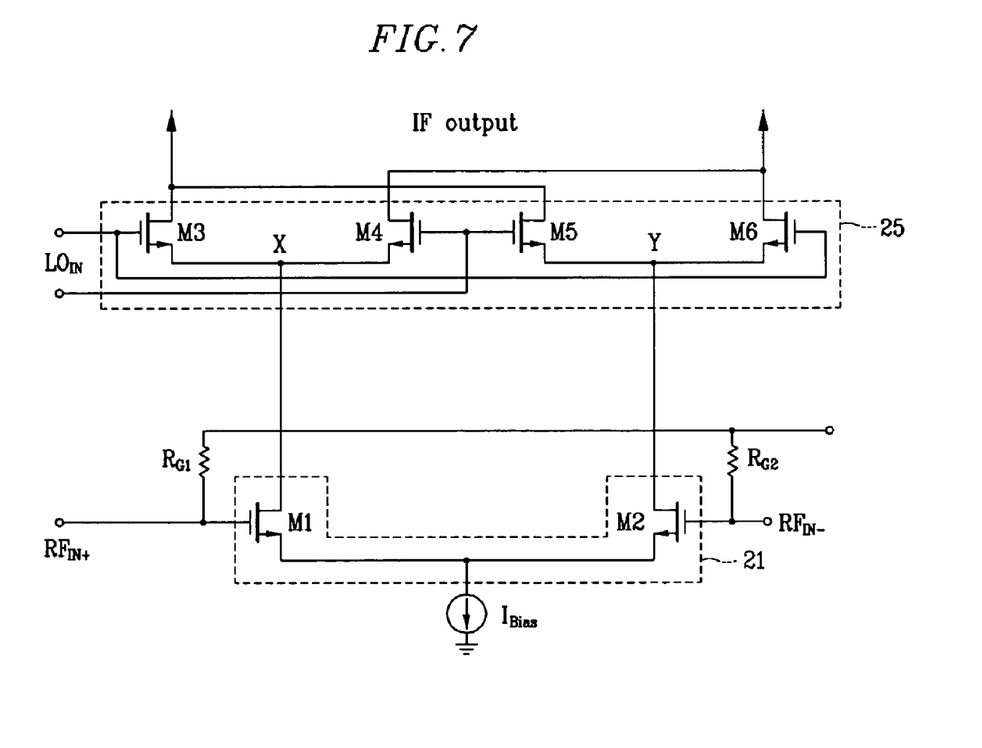
FIG. 7 shows a circuit of an active frequency converter according to a second example of the conventional method.

FIG. 6 shows a circuit of an active frequency converter according to a first example of the conventional method, and FIG. 7 shows a circuit of an active frequency converter according to a second example of the conventional method.

The active frequency converters shown in FIG. 6 and FIG. 7 provide a conversion gain by using a MOSFET, and are examples without filter circuits.

First, according to the active frequency converter shown in FIG. 6, a single input RF voltage signal is converted to a current signal by the transistor M1 in a drive 11. An LO signal applied from a local oscillator LO is multiplied to the converted current signal by the transistors M2 and M3 with switching functions.

Next, according to the active frequency converter shown in FIG. 7, the differential RF voltage signal is converted to a current signal by the transistors M1 and M2. An LO signal applied from a local oscillator LO is multiplied to the converted current signal by the transistors M3-M4 and M5-M6 with switching functions.

FIG. 6 shows a single balanced mixer circuit wherein the single input signal is inputted to the first drive, and FIG. 7 shows a double balanced mixer circuit wherein the differential input signal is inputted.

Figure 8:
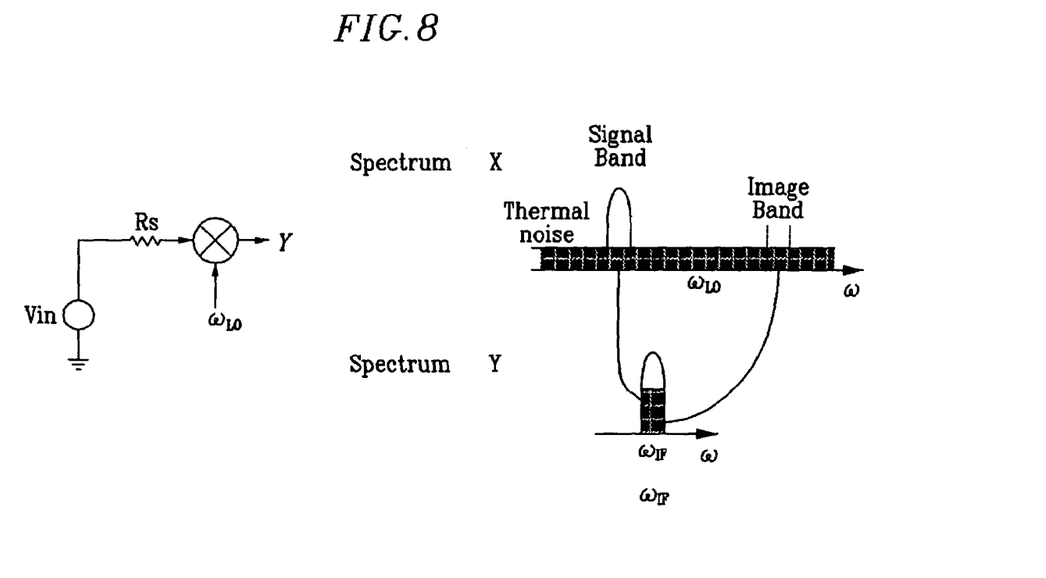
FIG. 8 shows the folding of RF and image noise into the IF band with a conventional frequency converter.

FIG. 8 shows the folding of RF and image noise into the IF band with a conventional frequency converter.

As shown in FIG. 8, a frequency component which is inputted to an input port X is composed of a signal component at a signal frequency band and a thermal noise due to a load resistor Rs of the input port at the signal frequency band and the image frequency band.

The signal component, the thermal noise at the signal frequency band, and the thermal noise at the image frequency are converted to signals at the intermediate frequency band in the process of frequency conversion. Thus, a signal-to-noise ratio at an output port Y becomes ½ the signal-to-noise ratio at the input port X, when the conversion gain at the signal frequency band is the same as the conversion gain at the image frequency band.

Thus, the noise figure property of the frequency converter becomes worse by a factor of two (3 dB) when the gain of the frequency converter is 1. That is, the noise figure property can be improved only when the gain of the conversion at the image frequency band is lower than the gain of the conversion at the signal frequency band. Otherwise, the noise figure property worsens.

Meanwhile, most communication systems require image frequency suppression of more than 60~70 dB to reject an image. However, the conventional method using the filter in the low noise amplifier cannot meet the system requirement. Thus, a device for suppressing an image is further required, apart from the low noise frequency amplifier.

SUMMARY OF THE INVENTION

It is an advantage of the present invention to provide a heterodyne receiver for low noise and image frequency repression which improves a noise figure property of a frequency converter and performs image frequency repression that is necessary at a low noise amplifier and the frequency converter. To provide the advantage, the present invention adds a filter to the frequency converter which decreases impedance at an image frequency band and increases impedance at an RF signal frequency. Thus, the noise by the image frequency band is reduced and the image frequency signal is repressed.

A heterodyne receiver for low noise and image frequency repression according to one aspect of the present invention comprises a low noise amplifier for receiving an input signal from an antenna and amplifying the signal while reducing a noise figure of the input signal; and a frequency converter for receiving the input signal outputted from the low noise amplifier and a local oscillation signal; filtering the signals to repress gain of the input signal at an image frequency band and increase gain of the input signal at a signal frequency band; and converting the frequency of the signals to an intermediate frequency band.

Here, the frequency converter preferably comprises: a local oscillation circuit for outputting a local oscillation signal being used for converting a frequency of the input signal; and a mixer circuit for converting a difference in frequency between the input signal outputted from the low noise amplifier and the local oscillation signal outputted from the local oscillation circuit to a predetermined intermediate frequency through a filtering process for image frequency repression and low noise.

The mixer circuit preferably comprises: a drive for receiving the input signal outputted from the amplifier and the local oscillation signal outputted from the local oscillation circuit and performing a filtering operation on the signals for image frequency repression; a switch for switching the input signal and the local oscillation signal outputted from the drive over time; and an intermediate output section for outputting the intermediate signal converted from the input signal and the local oscillation signal by using a switching operation of the switch.

The drive preferably comprises a series resonance filter composed of at least one inductor and at least one capacitor which are coupled with a drain output port of a field effect transistor (MOSFET).

The capacitor of the filter preferably has a variable capacitance.

The filter preferably allows a series resonance at an image frequency of the input signal due to the inductor and the capacitor; and allows a parallel resonance at a signal frequency due to a parasitic capacitance between the drain and the source of the field effect transistor.

The filter preferably reduces noise caused from the field effect transistor by increasing a drain current of the field effect transistor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

First, a heterodyne receiver for low noise and image frequency repression according to a first exemplary embodiment of the present invention is described in detail with reference to FIG. 9.

Figure 9:
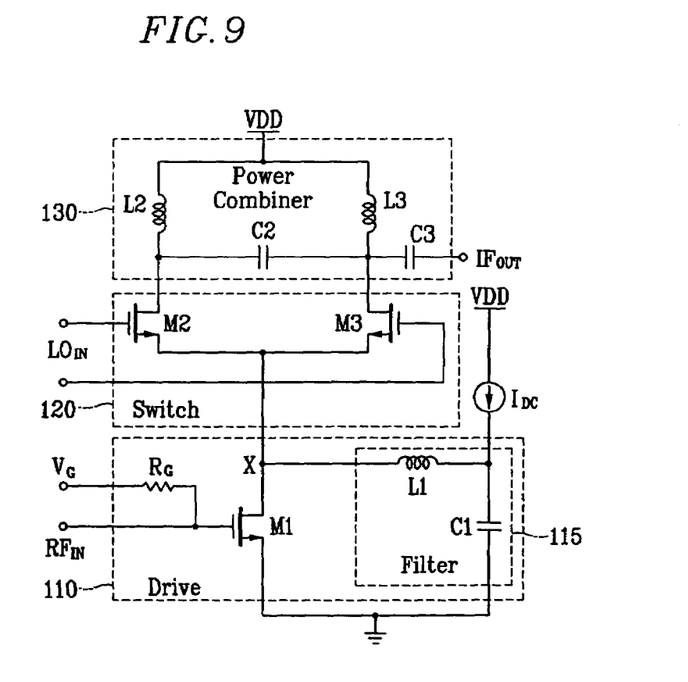
FIG. 9 is a circuit diagram showing construction of a frequency converter in a heterodyne receiver for low noise and image frequency repression according to a first exemplary embodiment of the present invention.

FIG. 9 is a circuit diagram showing construction of a frequency converter in a heterodyne receiver for low noise and image frequency repression according to a first exemplary embodiment of the present invention.

As shown in FIG. 9, the heterodyne receiver for low noise and image frequency repression according to the first exemplary embodiment of the present invention comprises an amplifier and a frequency converter including a local oscillation circuit and a mixer circuit 100.

In FIG. 9, M1 is an N-MOS FET of a drive 110; M2 and M3 are N-MOS FETs of a switch 120; $RF_{IN}$ is an RF input signal; $IF_{OUT}$ is an intermediate frequency output signal; $V_G$ is a bias voltage of a gate; VDD is a voltage of DC power; $R_G$ is a resistor for cutting off or breaking the RF signal; L1 is an inductor for a filter 115 and C1 is a capacitor for the filter 115; $LO_{IN}$ is an input signal of a local oscillator; $I_{DC}$ is a bleeding current; and L2, L3, C2, and C3 are a Power Combiner for converting a differential output to a single output.

The local oscillation circuit outputs a local oscillation signal having a stable oscillation frequency and low harmonic content, and the mixer circuit 100 converts the difference in frequency between an input signal outputted from the amplifier and the local oscillation signal to a predetermined intermediate frequency.

The mixer circuit comprises the drive 110, the switch 120, and the intermediate output section 130.

The drive 110 receives the input signal and the local oscillation signal and performs a filtering function for image frequency repression and low noise.

The switch 120 switches signals outputted from the drive over time and transfers the signals to the output section 130.

The intermediate output section 130 outputs the signal at the intermediate frequency from the input signal and the local oscillation signal by using a switching operation of the switch 120.

Here, the drive 110 for image frequency repression and low noise includes a serial resonance filter 115 composed of an inductor L1 and a capacitor C1 which is connected to a drain end of a field effect transistor M1.

The filter 115 allows serial resonance at the image frequency due to the inductor L1 and the capacitor C1, and allows parallel resonance at the signal frequency due to the parasitic capacitance Cp of the FET M1.

Further, the filter 115 increases a drain current of the FET M1 due to the bleeding current and can reduce noise caused from the FET M1.

Figure 10:
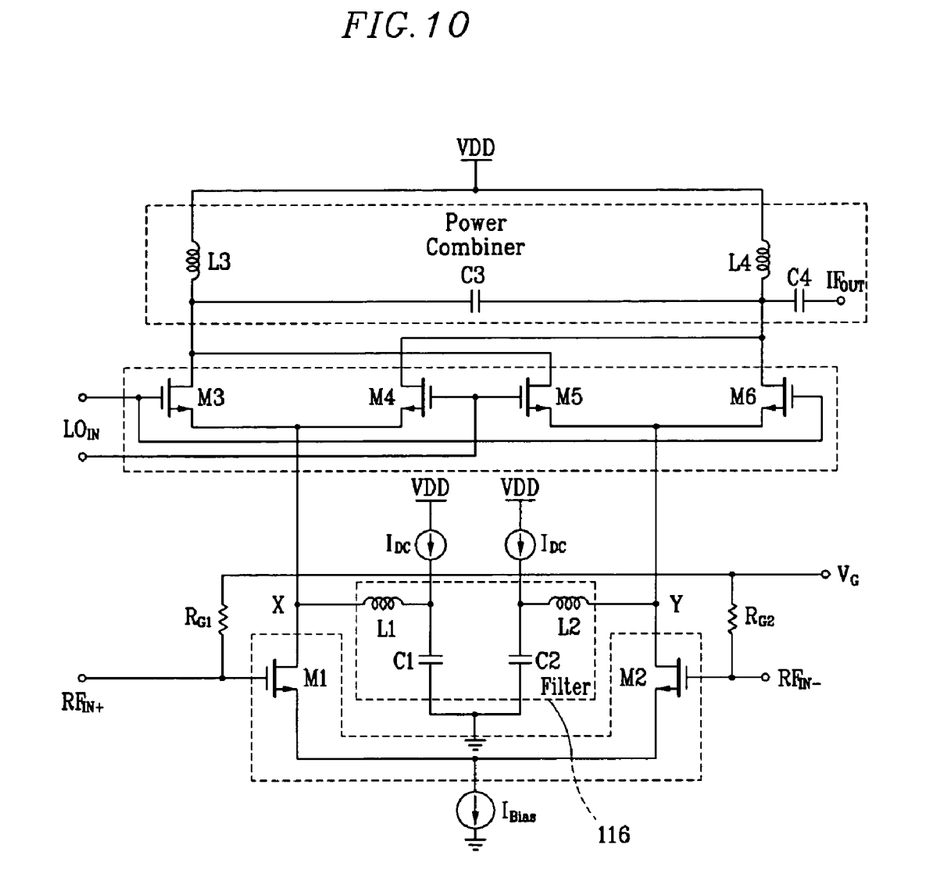
FIG. 10 is a circuit diagram showing construction of a frequency converter in a heterodyne receiver for low noise and image frequency repression according to a second exemplary embodiment of the present invention.
Figure 11:
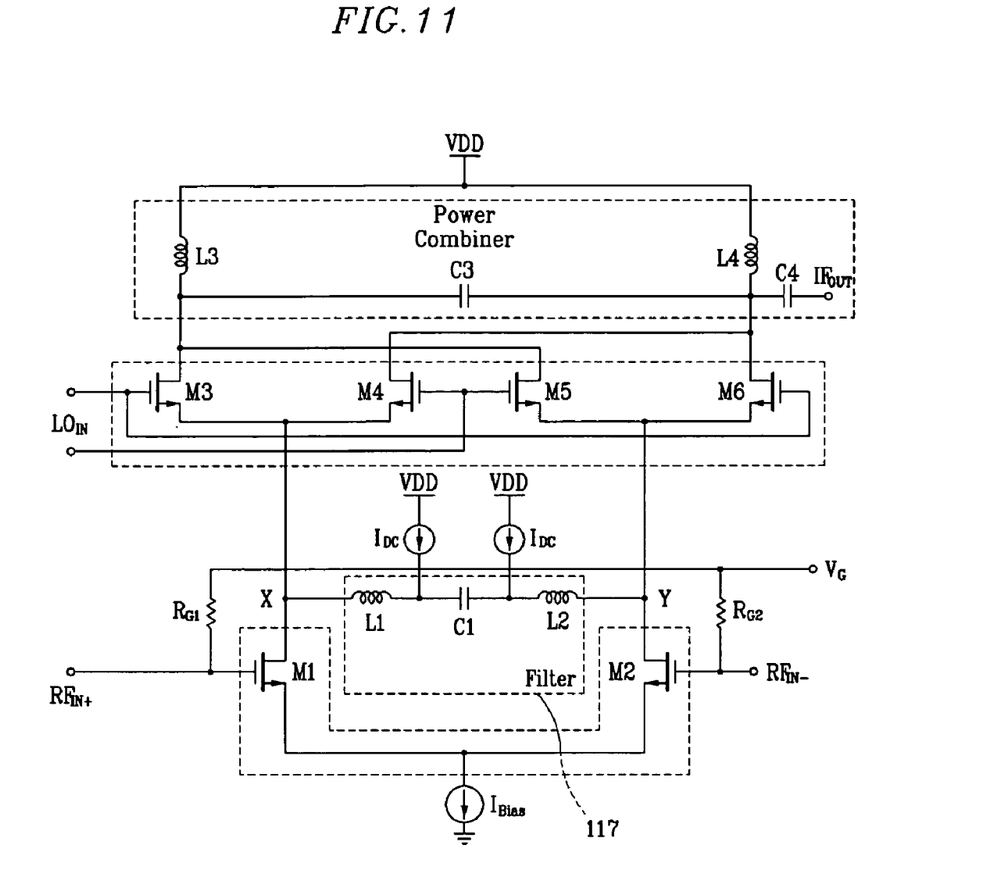
FIG. 11 is a circuit diagram showing construction of a frequency converter in a heterodyne receiver for low noise and image frequency repression according to a third exemplary embodiment of the present invention.
Figure 12:
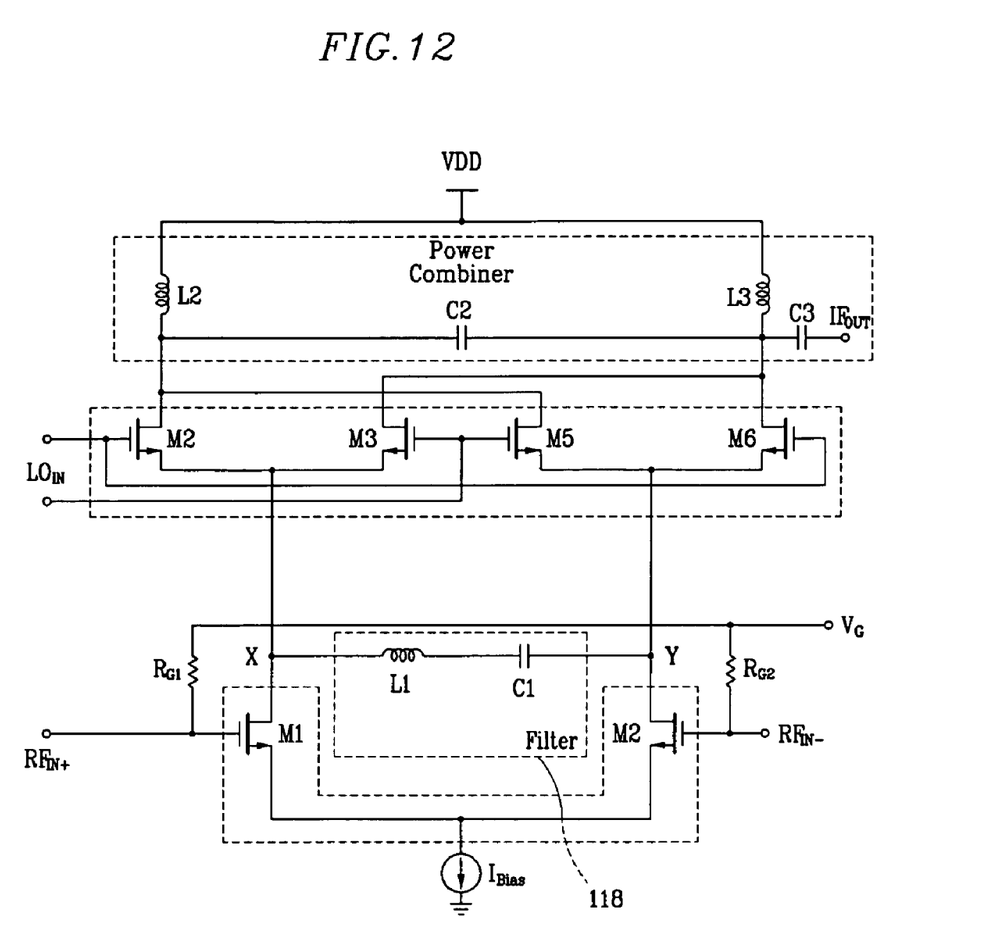
FIG. 12 is a circuit diagram showing construction of a frequency converter in a heterodyne receiver for low noise and image frequency repression according to a fourth exemplary embodiment of the present invention.

FIGS. 10 to 12 are circuit diagrams showing construction of frequency converters in heterodyne receivers for low noise and image frequency repression according to second to fourth exemplary embodiments of the present invention, respectively.

As shown in FIGS. 10 to 12, M1 and M2 are N-MOS FETs of drives; M3, M4, M5, and M6 are N-MOS FETs of switches; $RF_{IN+}$ and $RF_{IN-}$ are differential input signals; $R_{G1}$ and $R_{G2}$ are resistors for cutting off or breaking the RF signals; L1 and L2 are inductors for a filter 116; C1 and C2 are capacitors for the filter 116; and $I_{Bias}$ is a bias current.

The heterodyne receivers for low noise and image frequency repression according to the second to fourth exemplary embodiments of the present invention have the construction of the filters including a double balanced mixed circuit, which is different from the first exemplary embodiment.

That is, in the filter 116 of the secondary exemplary embodiment, the X node toward the drain output of the FET M1 is connected to the inductor L1 and the capacitor C1, and the Y node toward the drain output of the FET M2 is connected to the inductor L1 and the capacitor C1. And, in the filter 117 of the third exemplary embodiment, the inductors L1 and L2 are connected between the X node and the Y node, and the capacitor C1 is connected between the inductors L1 and L2. In the filter 118 of the fourth exemplary embodiment, the inductor L1 and the capacitor C1 are connected between the X node and the Y node.

Although the construction of filters according to the second to fourth exemplary embodiments of the present invention are different from the first exemplary embodiment, the filters according to the second to fourth exemplary embodiments have the same function for low noise and image frequency repression.

Hereinafter, operation of the heterodyne receiver for low noise and image frequency repression according to the exemplary embodiment is described with reference to the appended drawings.

Figure 13:
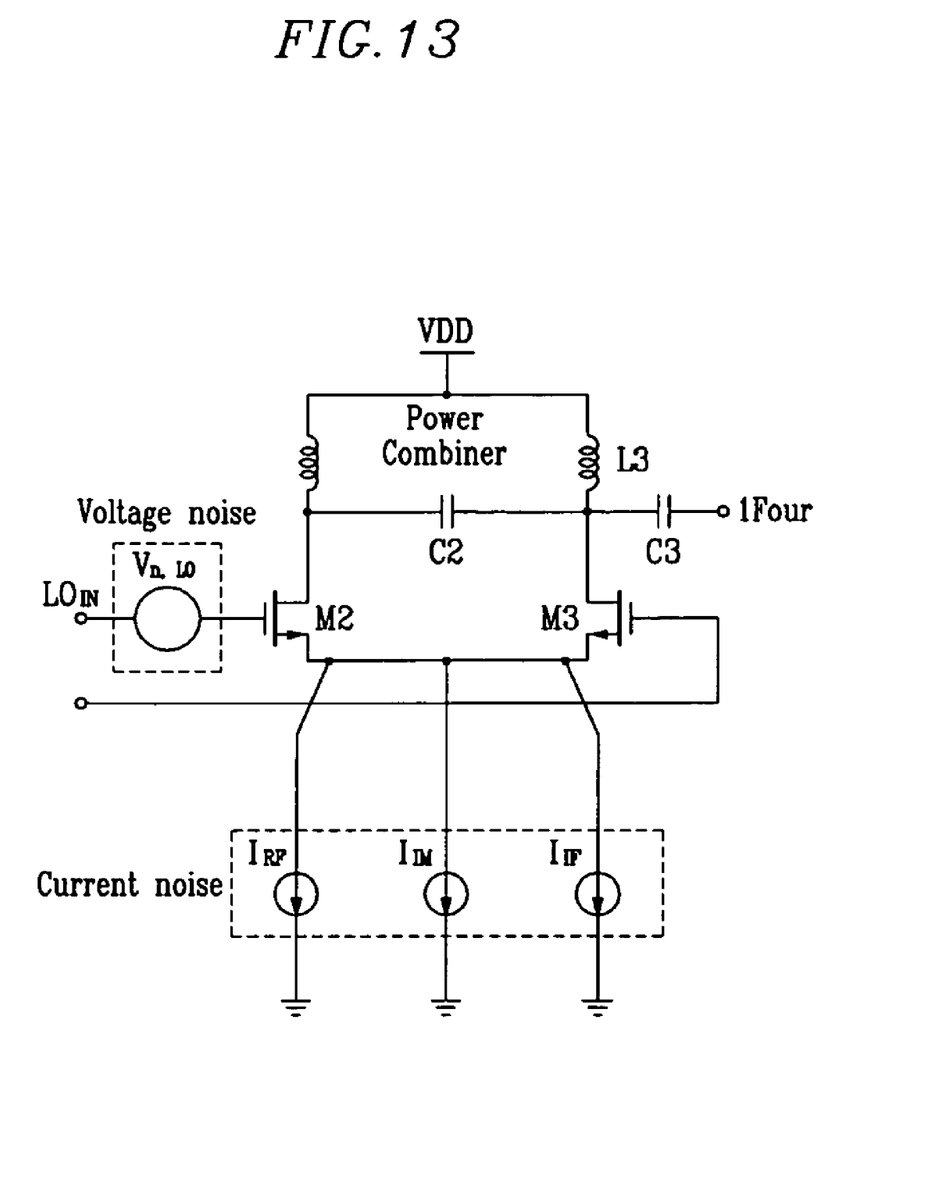
FIG. 13 shows modeling of properties of a noise figure of the frequency converter shown in FIG. 9.

FIG. 13 shows a model for a property of noise figure of the frequency converter shown in FIG. 9.

As shown in FIG. 13, the noise of the frequency converter is divided into current noises $I_{RF}$, $I_{IM}$, and $I_{IF}$ at the drive 110. $I_{RF}$ is a current noise at the RF signal frequency band, $I_{IM}$ is a current noise at the image frequency band, and $I_{IF}$ is a current noise at the intermediate frequency band.

Meanwhile, the noise of the switch 120 is periodically changed on a time basis and is modeled as a voltage noise $V_{N,LO}$ at gates of FETs M2 and M3.

The property of noise figure is explained as follows.

The conversion gains to the intermediate frequency output are respectively calculated from the current noises $I_{RF}$, $I_{IM}$, and $I_{IF}$ at the RF signal frequency band, and each conversion gain is multiplied by each corresponding current noise. The sum of noises at the intermediate frequency output is as in the following Equation 1.

$$\overline{I}_{no}^2 = \overline{I}_{RF}^2 G_{C,RF}^2 + \overline{I}_{IM}^2 G_{C,IM}^2 + \overline{I}_{n,LO}^2 + \overline{I}_{n,R_L}^2 \quad \text{[Equation 1]}$$

Here, $G_{C,RF}$ is a current conversion gain of the intermediate frequency output, and $G_{C,IM}$ is a current conversion gain of the intermediate frequency output. $I_{N,LO}$ is a current noise by the voltage noise $V_{N,LO}$ at intermediate frequency output. $I_{N,RL}$ is a current noise when the intermediate frequency output is connected to the load resistor $R_L$.

The current noise $I_{IF}$ at the intermediate frequency band is not included in output noise when the intermediate frequency output is a differential output.

In Equation 1, $\overline{I}_{RF}^2 G_{C,RF}^2$ and $\overline{I}_{IM}^2 G_{C,IM}^2$ are the main causes of noise, the filter 115 improves noise performance by reducing the conversion gain at the image frequency, that is $\overline{I}_{IM}^2 G_{C,IM}^2$.

In Equation 1, $\overline{I}_{n,LO}^2$ can be minimized by increasing input power of the local oscillation circuit, since $\overline{I}_{n,LO}^2$ is obtained from the local oscillation signal.

The sum of noise currents can be calculated from output at the intermediate frequency by using the Equation 1. The noise viewed at the input side can be calculated by dividing the sum of noise currents from the output at the intermediate frequency by the conversion gain from the RF input signal to the output at the intermediate frequency output. The noise figure can be calculated by dividing the noise viewed at the input side by the thermal noise caused by the resistor Rs.

At this time, voltage noise $\overline{V}_{no}^2$ from the output at the intermediate frequency can be calculated from the result of multiplication of the sum of the current noise $\overline{I}_{no}^2$ by the load resistor $R_L$ at the output port. And the voltage noise $\overline{V}_{no}^2$ viewed at the input side can be calculated from the result of division of the voltage noise $\overline{V}_{no}^2$ by the voltage conversion gain Ac from the RF input signal to the signal at the intermediate frequency.

$$\overline{V}_{no}^2 = \overline{I}_{no}^2 \times R_L^2$$

$$\overline{V}_{ni}^2 = \overline{V}_{no}^2 / A_C^2 \quad \text{[Equation 2]}$$

The noise figure can be calculated from the result of division of the voltage noise $\overline{V}_{ni}^2$ by a thermal noise 4kTRs of the load resistor Rs at the input port as in the following Equation 3.

$$NF = \overline{V}_{ni}^2 / 4kTR_S \quad \text{[Equation 3]}$$

In Equation 3, k is a Boltzmann constant, and T is a noise temperature.

As shown in FIG. 9 to FIG. 12, serial resonance between the inductor L1 and the capacitor C1 in the filter 115 occurs at the image frequency. Thus, the input impedance |Zf| decreases at the image frequency and increases at a desired RF signal frequency.

The current signal of the image frequency at the X node is repressed due to the low impedance at the image frequency, and the conversion gain to the output at the intermediate frequency falls. Thus, the image impedance is repressed. However, the filter 115 increases the conversion gain at the desired signal frequency due to high impedance.

Figure 14:
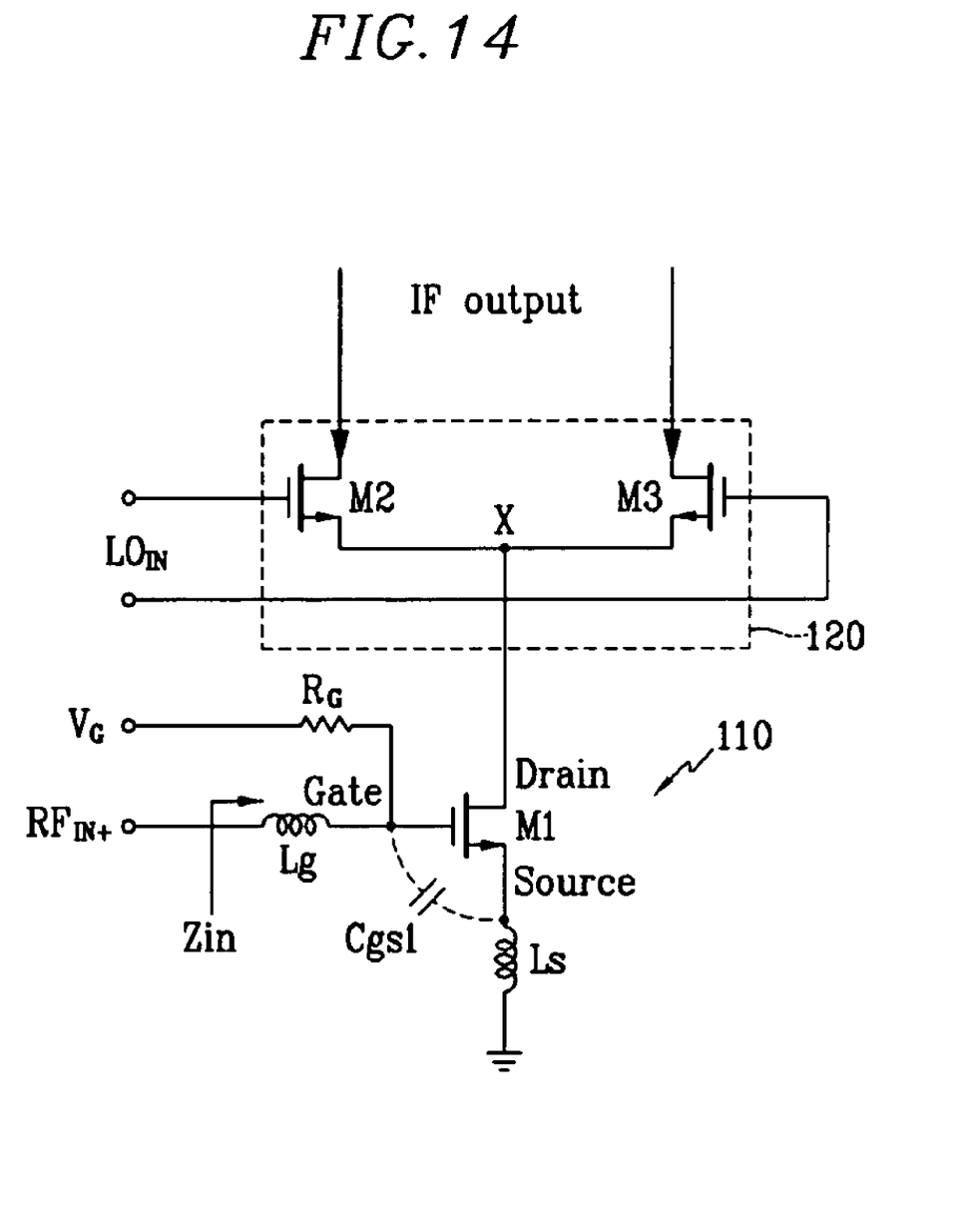
FIG. 14 shows a matching condition for a drive of a frequency converter shown in FIG. 9.

FIG. 14 shows a matching condition for a drive of a frequency converter shown in FIG. 9.

As shown in FIG. 14, when the input impedance is set to 50 Ω by using the inductors Ls and Lg, the input impedance $Z_{in}$ can be determined as in the following Equation 4.

$$Z_{in} = \frac{g_{m1}}{C_{gs1}} Ls + jw(Ls + Lg) + \frac{1}{jwC_{gs1}} \quad \text{[Equation 4]}$$

The Equation 4 can be divided into a real part and an imaginary part. The first element in the real part is set to 50 Ω, and the Ls and Lg values are determined to allow serial resonance in the imaginary part. The real part and the imaginary part are offset to each other. Here, gm1 is a trans-conductance of the FET M1, and Cgs1 is a capacitance between a gate and source of the FET M1.

The results of a trial experiment wherein predetermined values are assigned to each element in FIG. 9 are shown in the following Table 1.

TABLE 1

| Construction | | Bleeding Current (mA) | RF to IF conversion gain (dB) | Noise figure (dB) | Consumption current (mA) | Supply power (V) |
|---|---|---|---|---|---|---|
| Single Balanced Mixer | Without filter | | 6.836 | 10.280 | 4.80 | 3 |
| | With filter | 0 | 6.236 | 8.468 | 4.80 | |
| | | 1 | 6.006 | 8.126 | 4.81 | |
| | | 2 | 5.705 | 7.823 | 4.83 | |
| | | 3 | 5.104 | 7.696 | 4.86 | |
| Double Balanced Mixer | Without filter | | 6.764 | 9.212 | 8.63 | 3 |
| | With filter | 0 | 8.721 | 6.485 | 8.63 | |
| | | 1 | 9.067 | 6.438 | 8.63 | |
| | | 2 | 9.171 | 5.953 | 8.63 | |
| | | 3 | 8.525 | 5.470 | 8.63 | |

For the trial experiment, the RF input signal was set to 5.25 GHz, the input power was set to −30 dBm, the local oscillation signal was set to 4.25 GHz, the input power was 0 dBm, and the output at the intermediate frequency was set to 1 GHz which corresponds to the difference between the input signal and the local oscillation signal.

A bond wire with 0.8 nH per 1 mm was used for the Ls, since the Ls has a relatively small capacity. The Lg was assumed to be an OFF-CHIP inductor.

As shown in Table 1, when the filter is added to the frequency converter, the property of the noise figure is improved by around 1.8~2.7 dB even when the bleeding current is 0 mA. The property of the noise figure is further improved when the bleeding current increases.

At this time, the conversion gain from the RF signal frequency to the intermediate frequency was around 5~9 dB.

The total performance of the system becomes much worse in the communication system, wherein the several circuits are connected in series, when the property of the noise figure for the circuit which is connected later is poor.

As such, the exemplary embodiment of the present invention increases the conversion gain at the RF signal frequency band, and decreases the conversion gain at the image frequency band by adding the filter to the output node of the drive of the frequency converter. Thus, the thermal noise at the image frequency band represses the conversion gain of the intermediate frequency band and improves the property of the noise figure and can perform image frequency repression.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As such, the heterodyne receiver for low noise and image frequency repression of the present invention increases the conversion gain to the output at the intermediate frequency at the RF signal frequency band, decreases the conversion gain at the image frequency band, and improves the property of the noise figure by adding the filter to the output node of the drive of the frequency converter. Thus, the image frequency signal is repressed and the distortion of the desired signal can be minimized.

What is claimed is:

1. A heterodyne receiver for low noise and image frequency repression, comprising:

a low noise amplifier for receiving an input signal from an antenna and amplifying the signal while reducing a noise figure of the input signal; and a frequency converter for receiving both the input signal outputted from the low noise amplifier and a local oscillation signal, filtering the signals to repress gain of the input signal at an image frequency band and to increase gain of the input signal at a signal frequency band, and converting the frequency of the signals to an intermediate frequency band;

wherein the frequency converter comprises a local oscillation circuit for outputting a local oscillation signal being used for converting the frequency of the input signal; and a mixer circuit for converting the difference in frequency between the input signal outputted from the low noise amplifier and the local oscillation signal outputted from the local oscillation circuit to a predetermined intermediate frequency through a filtering process for image frequency repression and low noise; and wherein the mixer circuit comprises a drive for receiving the input signal outputted from the amplifier and the local oscillation signal outputted from the local oscillation circuit and performing a filtering operation on the signals for image frequency repression; a switch for switching the input signal and the local oscillation signal outputted from the drive over time; and an intermediate output section for outputting the intermediate signal converted from the input signal and the local oscillation signal by using a switching operation of the switch.

2. The heterodyne receiver of claim 1, wherein the drive comprises a serial resonance filter composed of at least one inductor and at least one capacitor which are coupled with a drain output port of a field effect transistor (MOSFET).

3. The heterodyne receiver of claim 1, wherein the capacitor of the filter has a variable capacitance.

4. The heterodyne receiver of claim 1, wherein the filter allows a serial resonance at the image frequency of the input signal due to the inductor and the capacitor; and allows a parallel resonance at the signal frequency due to a parasitic capacitance between a drain and a source of the field effect transistor.

5. The heterodyne receiver of claim 1, wherein the filter reduces noise caused by the field effect transistor by increasing a drain current of the field effect transistor.

* * * * *